US010410169B2

(12) United States Patent
Vasantham et al.

(10) Patent No.: US 10,410,169 B2
(45) Date of Patent: Sep. 10, 2019

(54) SMART INVENTORY MANAGEMENT AND DATABASE SHARDING (71) Applicant: Wal-Mart Stores, Inc., Bentonville, AR (US)

(72) Inventors: Madhavan Kandhadai Vasantham, Foster City, CA (US); Sreekanth Sreedhararaj, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1023 days.

(21) Appl. No.: 14/292,530

(22) Filed: May 30, 2014

(65) Prior Publication Data
US 2015/0347957 A1 Dec. 3, 2015

(51) Int. Cl.
G06Q 10/08 (2012.01)
G06F 16/28 (2019.01)
(Continued)

(52) U.S. Cl.
CPC .......... G06Q 10/087 (2013.01); G06F 16/23 (2019.01); G06F 16/2455 (2019.01);
(Continued)

(58) Field of Classification Search
CPC ......... G06F 17/30312; G06F 17/30327; G06F 17/30575; G06F 17/30584;
(Continued)

(56) References Cited

U.S. PATENT DOCUMENTS 7,856,440 B2 12/2010 Alpem
8,037,024 B1 10/2011 Bozkaya
(Continued)

FOREIGN PATENT DOCUMENTS

EP 2637111 11/2013

OTHER PUBLICATIONS

Bloomberg, Jason. The Agile Architecture Revolution: How Cloud Computing, REST-Based SOA, and Mobile Computing are Changing Enterprise IT. New York: John Wiley & Sons, Incorporated, Jan. 23, 2013.*

(Continued)

Primary Examiner — Nathan C Uber
Assistant Examiner — Fawaad Haider
(74) Attorney, Agent, or Firm — Bryan Cave Leighton Paisner LLP (57) ABSTRACT A method for sharding a store inventory database is provided. The method may include separating a store inventory database into a first inventory database shard in a first inventory database server which has inventory data for a first group of items sold by a store and into a second inventory database shard in a second inventory database server which has inventory data for a second group of items sold by the store which are different than the first group of items. The method may also include associating a router with the sharded store inventory database, the router housing resident shard determination logic which comprises information which, for an item sold by the store, identifies an inventory database shard on which inventory data for the item is stored.

20 Claims, 8 Drawing Sheets (51) Int. Cl.
- *G06F 16/2455* (2019.01)
- *G06Q 30/00* (2012.01)
- *G06F 16/2457* (2019.01)
- *G06F 16/9535* (2019.01)
- *G06F 16/23* (2019.01)

(52) U.S. Cl.
CPC ...... *G06F 16/24578* (2019.01); *G06F 16/285* (2019.01); *G06F 16/9535* (2019.01); *G06Q 10/08* (2013.01); *G06Q 10/0875* (2013.01); *G06Q 30/018* (2013.01)

(58) Field of Classification Search
CPC ............ G06F 17/30864; G06Q 30/018; G06Q 10/087; G06Q 10/08; G06Q 10/0875
USPC .......................................................... 705/28
See application file for complete search history.

(56) References Cited

U.S. PATENT DOCUMENTS

| | | |
|---|---|---|
| 8,189,964 B2 | 5/2012 | Flynn |
| 8,229,945 B2 | 7/2012 | Dinker |
| 8,380,738 B2 | 2/2013 | Tatemura |
| 8,458,209 B2 | 6/2013 | Clarke |
| 8,600,975 B1 | 12/2013 | Cao |
| 8,666,991 B2 | 3/2014 | Peters |
| 8,688,697 B1 | 4/2014 | Nayar |
| 2007/0282979 A1 | 12/2007 | Tuel |
| 2011/0202929 A1 | 8/2011 | Schleimer |
| 2012/0254175 A1 | 10/2012 | Horowitz |
| 2012/0310878 A1 | 12/2012 | Vuksan |
| 2013/0073581 A1 | 3/2013 | Sandholm |
| 2013/0221093 A1 | 8/2013 | Patel et al. |
| 2013/0290249 A1 | 10/2013 | Merriman |
| 2014/0012814 A1 | 1/2014 | Bercovici |
| 2014/0052689 A1 | 2/2014 | Ficara et al. |
| 2014/0108421 A1 | 4/2014 | Isaacson |
| 2014/0122510 A1 | 5/2014 | Namkoong |
| 2014/0156632 A1 | 6/2014 | Yu |
| 2014/0372489 A1 | 12/2014 | Jaiswal |
| 2015/0161148 A1 | 6/2015 | Randell et al. |
| 2015/0302406 A1 | 10/2015 | Pastore |

OTHER PUBLICATIONS

Amigue, Eugene. IBM Sterling Selling and Fulfillment Suite—9.2.1—Scalability Capabilities (2013) Jul. 15, 2013.

\* cited by examiner

SMART INVENTORY MANAGEMENT AND DATABASE SHARDING

BACKGROUND INFORMATION

Field of the Disclosure

The present invention relates to inventory management. In particular, examples of the present invention relate to a system to increase bandwidth for managing inventory in a store and to interact with other store systems such as the order management systems. Such a system improves the performance in filling customer orders.

Background

Many stores are providing increased venues for making sales to customers. Some stores now provide physical retail locations, online shopping and sales, and even online marketplaces where third party goods are sold to customers. While there are many benefits to implementing these additional venues for sales, these additional sales outlets create corresponding increases in the demands on store computer systems. Properly executed, internet technologies can provide additional venues for communicating with customers and can increase sales and revenue for a store.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how to improve inventory database bandwidth for improving speed and reliability in filling customer orders as well as in allowing customers to place orders over the internet and otherwise purchase from the store. Particularly, the present disclosure describes how a computer system may be used to shard the store inventory database for an inventory management system in order to provide increased accuracy and responsiveness in providing inventory status. This provides increased accuracy and quicker response in allowing customers to place on line order and reduces latency and conflicts for a customer who is using a store order management system.

Many retailers desire to provide additional sales venues such as online ordering and order management for customers. Many retailers desire to allow customers to accurately search store inventory online when locating an item for purchase at a local store location. Store inventory systems, however, are frequently taxed to a point where customers are not able to search inventory or place or manage orders without significant delay or without significant conflicts and technical problems. This is particularly true during periods of heavy sales volume. Some retailers will experience a massive increase in the number of customers and online orders during particular periods of the year, such as holidays. As online ordering and marketplace sales have become much more commonplace, particular retailers may experience tens of thousands of customer visits per minute and thousands of potential orders per minute. Current inventory and order management systems cannot handle such a load. Traditional inventory management systems operate on a single database in order to maintain the reliability of the inventory database.

Figure 1:
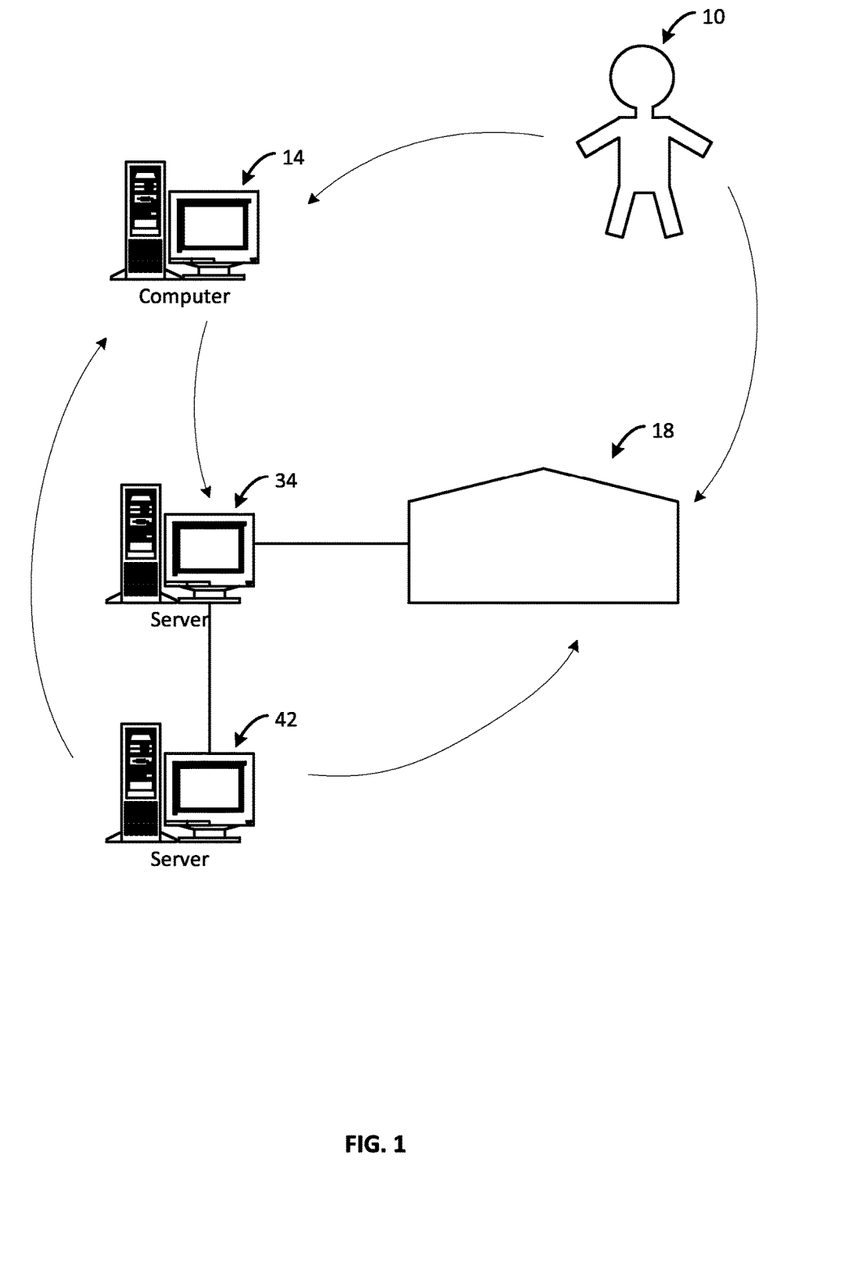
FIG. 1 is a schematic illustrating a computer system in context of an order management system.

Referring to FIG. 1, a computer system is utilized to provide an inventory management system for a store which is able to handle large numbers of orders per minute for sustained periods of time. The computer system includes a sharded inventory database along with database management, router, and shard determination logic which allow sharding of a transactional database such as an inventory database. The inventory database interacts with an order management application layer. Traditionally, transactional databases have been monolithic databases due to their dynamic nature and the differing demands of transactional database compared to an informational database.

A store 18 may sell goods to a customer 10 in various different venues. The store 18 may make sales at a physical location. The store 18 may also provide an online storefront where a customer 10 may order items from the store. These items may be picked up at the store 18 by the customer 10, or may be shipped to the customer. The store 18 may also provide an online marketplace where items which are not sold in the store retail locations are offered to customers. In order to support these sales, the store 18 includes a server system 26 which may include multiple different components as discussed herein.

In one example, the store server system may include an order management server 34. The order management server 34 may allow customers to place orders with the store 18 and may allow for management of those orders. The store server system 26 may also include an inventory server 42. The inventory server 42 may store inventory information for the store 18. The inventory server 42 may store inventory information for items sold at a brick and mortar store location as well as for items available for purchase from the store online as well as in an online marketplace environment. The inventory server 42 may be used to determine the availability of products for delivery to a store physical location, shipment to a customer, and also for products sold by a third party in an online marketplace environment which is hosted by the store server system 26.

Figure 2:
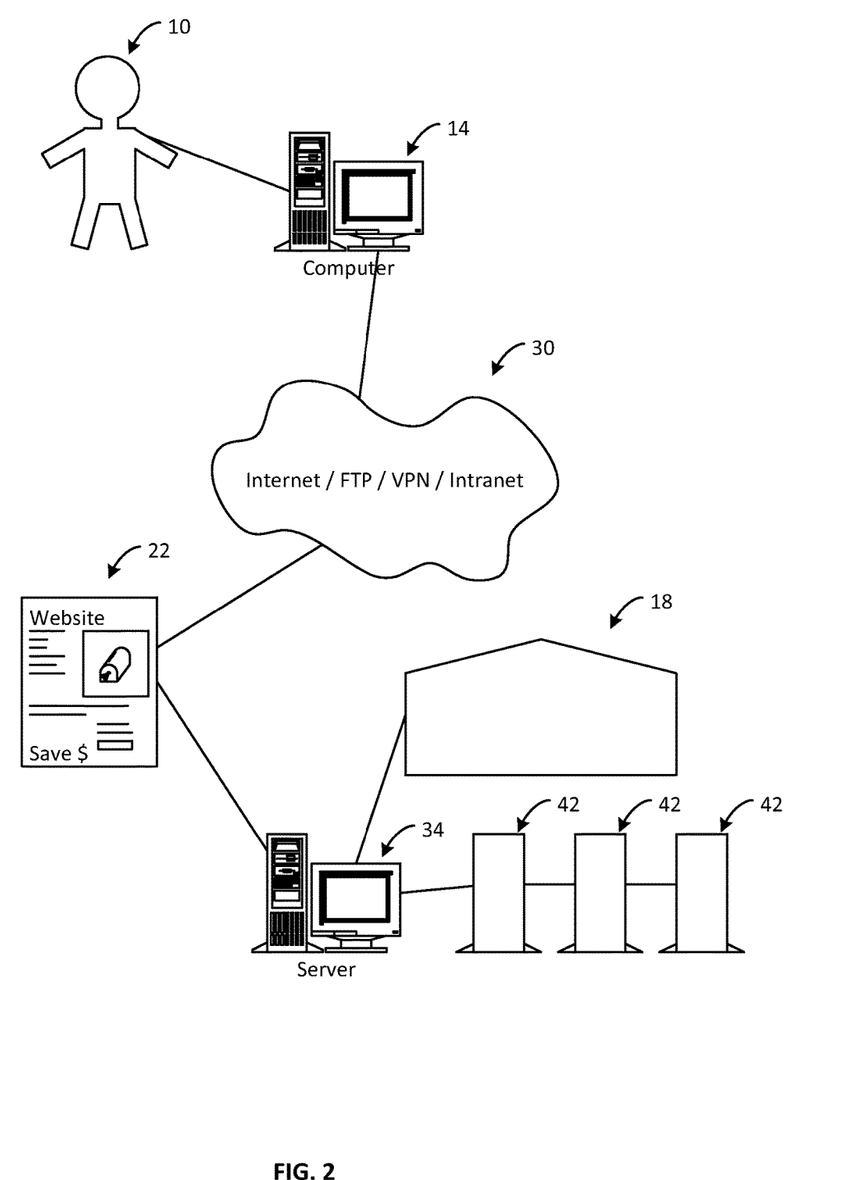
FIGS. 2 and 3 are a schematics illustrating additional aspects of the computer system.

FIG. 2 shows additional aspects of the store computer system. A customer 10 may shop at a brick and mortar store location 18. Alternatively, the customer 10 may use a computer 14 to order products from a store website 22 and then pick up the products at the store or have the products delivered to their home. The website 22 may be hosted by a store computer such as the order management system server 34. The customer 10 may also order products from a store market place website 22 to have the products delivered to their home. The store marketplace website 22 may be hosted by a store computer such as the order management system server 34, but the marketplace website typically features products for sale which are not available in a brick and mortar store location 18. The marketplace may feature products which are offered for sale by a third party and are sold from a store warehouse, or which are offered for sale by a third party and shipped directly from the third party. The customer computer 14 and the order management system server 34 may be connected and enabled to communicate via the internet 30.

A conventional inventory server includes a single database in order to maintain the reliability of the inventory. In some situations, however, a conventional inventory database is not sufficient and may be replaced by an array of inventory servers 42A, 42D, 42C which each host shards 50 of a sharded inventory database. For example, Walmart.com receives a significant amount of customer traffic during regular parts of the year. This customer traffic may include customers placing orders as well as customers later checking on order status, performing a return, etc. During holidays such as Christmas Walmart.com may receive upwards of 10,000 orders per minute for sustained periods of time. This high amount of customer orders cannot be sustained by a conventional store inventory database. As order volume grows exponentially, heavy database contentions, long DB lock times, slow inventory supply processing, slower inventory reservations, slower inventory availability calls, and slower order processing plague a traditional inventory database.

Figure 3:
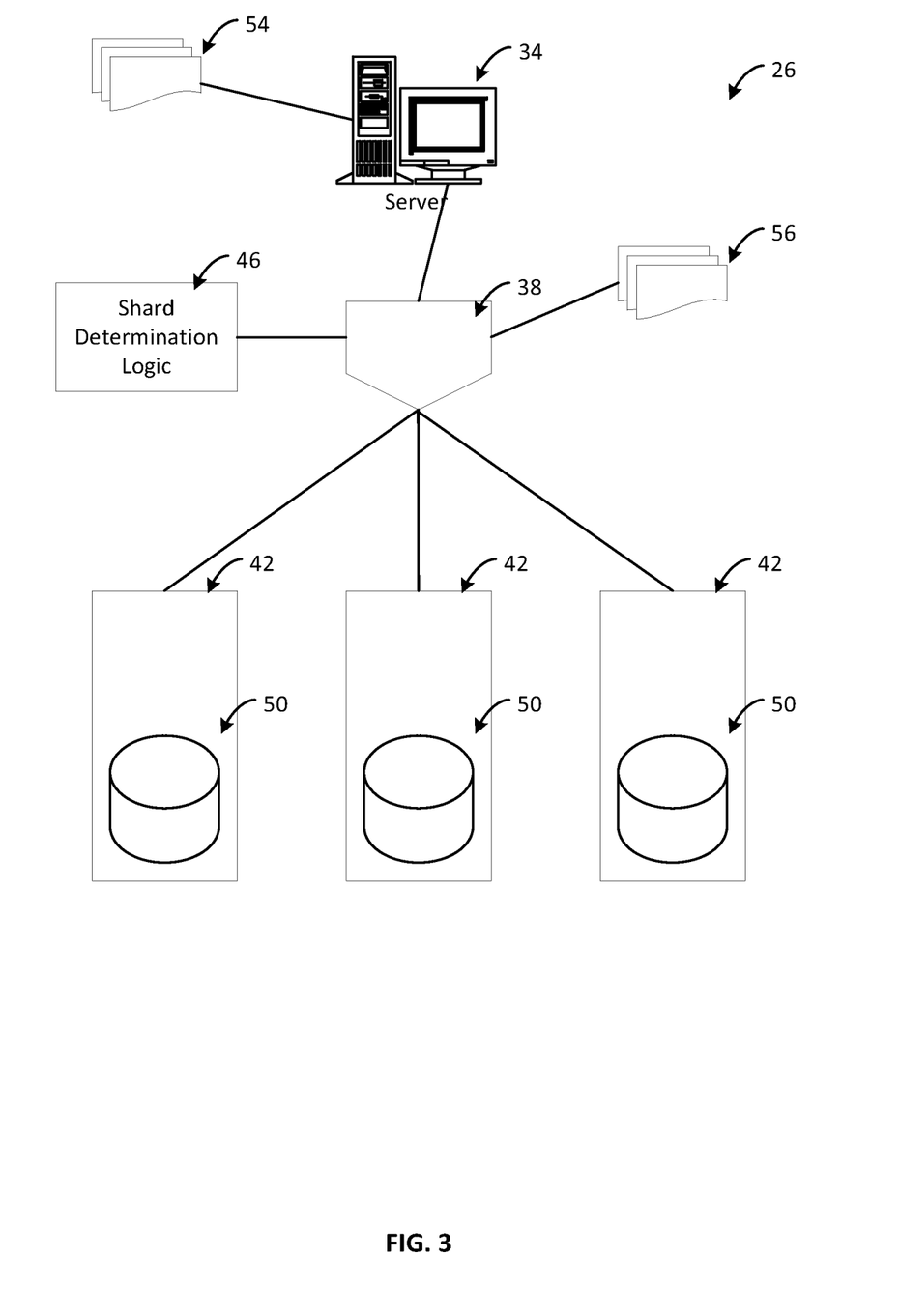

Referring to FIG. 3, a store order management system 26 may include one or more order management servers 34. The order management server 34 may host a store website 22 or which otherwise provide a web portal through which a customer may place an online order with the store 18 or store marketplace or otherwise manage an account with a store 18. In some instances, the customer may be a vender who provides goods to the store and manages orders, returns, etc. as a client of the order management system 26. The order management server 34 may facilitate the collection and presentation of information to a customer 10 in the process of interacting with the customer during shopping experiences. The server 34 may communicate with the customer 10 via a customer computer 14 and via the internet 30 or other communication systems. The customer computer 14 may be one of a variety of different electronic devices such as a smart phone, tablet computer, laptop, personal computer, etc. The customer 10 may use a computer 14 to provide information to the server 34 and to receive information from the server 34 in the context of online shopping and order management with the store 18.

The computer system 26 may also include other computing devices. Particularly, the system may include a router 38 which controls the flow of information to multiple inventory database servers 42. Each of the multiple inventory database servers 42 includes a shard 50 of a larger overall inventory database. The router 38 includes shard determination logic 46 which is used to determine which inventory database server 42 (i.e. which inventory database shard 50) should be accessed with regards to a particular customer request (i.e. a customer order, order lookup, return, etc.). The shard determination logic 46 may be present on the router 38 in the form of software or firmware. The router 38 may be implemented as a server which is configured to operate as a router or as a dedicated, single-purpose hardware router. In some instances, a single server may implement the functionality of an order management server, a customer portal, and a router for the inventory database server 42 and shards 50.

An order management system (OMS) application layer 54 may reside in and be implemented by the order management server 34 (customer portal), may be implemented by a router 38, or may be implemented by a server which performs both the functions of an order management server/customer portal and router. The OMS application layer 54 may typically be implemented at a single location such as the server 34 and, via the router 38, communicates with the different inventory database servers 42 such that each individual database server 42 provides inventory data from an individual shard 50 to the router 38 and to the OMS application layer 54/order management server 34.

The inventory data is provided to the order management server 34 in response to a customer, via a computer 14 and the internet 30, viewing items for sale on a website 22. The inventory data is used by the order management system 26 to provide accurate order information to the order management system 26 so that the order management system can provide this information to a customer during the order process. This allows the customer to verify availability of an item before purchasing the item. The customer may verify that the item is available for pickup at a particular store location or is available to be shipped to their home. As orders are placed by customers, the inventory data may be modified by the order management system to reflect that particular items are no longer available and the order management system may indicate that particular items from inventory are to be pulled from inventory for customer pickup or for shipping to a customer.

The order management system may include an inventory management system (IMS) application layer 56. The IMS application layer 56 may be implemented in the router 38. The router 38 may be an inventory system router which is particularly associated with the inventory management servers 42 to direct traffic to and from the various inventory database shards 50. The IMS application layer 56 is not sharded so that the IMS application layer has visibility across the inventory database shards 50 and so that the IMS application layer is able to perform some of the inventory maintenance services.

The order management system 26 is thus sharded at the inventory database level. Each database server 42 includes a database shard 50 which is part of a larger overall database that forms the store inventory database. Each database server 42 thus may communicate with the order management system 26 (e.g. the OMS application layer 54/order management server 34) to receive request and information from the system 26 and to provide information to the system 26.

The customer computer 14 may be used to send and receive order information associated with one or more orders placed with the store 18. The software, hardware, and associated components of a computer system may be programmed and configured to implement one or more embodiments described herein. Customers 10 may communicate with a store order management server 34 via a network connection or internet connection, internet 30, and webpage 22 to place orders with the store 18 and to manage orders with the store.

To participate in online or computer assisted shopping with the store, customers 10 may be invited to create an account with the store. Customers 10 who desire a store account will provide customer information such as identifying information, password information, contact information, etc. The store may store customer information in an electronic record associated with the customer 10 in a customer database, such as in order management server 34. The server 34 may store information regarding the customer 10 and regarding customer preferences in the context of a customer account created by the customer. The server 34 may thus store contact information for the customer 10 (or for the electronic device 14 used by the customer and associated with the customer account). The server 34 may also store customer purchase history and purchase information associated with the customer 10.

The computer 14 (smart phone, tablet computer, laptop, desktop computer, etc.) typically includes a body or case which houses internal electronic s such as a processor, storage, memory, battery, communications device, etc. The computer 14 includes a user interface such as screen, keyboard, mouse, etc. The various components of the computer 14 allow the computer 14 to perform the functions and display the data discussed herein.

The customer 10 may use the computer 14 to transmit order information to the server 10, particularly in the context of placing an order. The customer may log into a customer account at a store webpage 22 in order to place or manage an order. In placing an order, the customer may select items for purchase, select a shipping method and destination, and pay for the order. In placing an order, one or more of the inventory database servers 42 may transmit inventory data to the customer computer 14. Particularly, the inventory data may indicate which items are available for purchase, which items are available for shipment to the customer's house, where the items may ship from, which items are available for store pickup at a selected brick and mortar store location, etc. This information assists the customer in making a purchasing decision.

The order management system 26 may receive information from the customer computer 14 and may provide information to the customer computer 14. In providing a system 26 which utilizes an OMS application 54 and a sharded inventory database 50, the system 26 functions in a way which is transparent to the customer 10. The order management server 34 may provide a communications portal with the customer as it receives information from and provides information to the customer 10 via an internet browser or the like. The order management server 34 (or a router 38) implements an OMS application layer 54. The OMS application layer may include software, firmware, etc. which allows customers to place orders, retrieve orders, view orders, manage orders, create and manage returns, etc.

The router 38 routes information to and from an appropriate database server 42 which is housing a shard of the overall store inventory database. The router 38 includes shard determination logic 46 in the form of software or firmware to determine which shard 50 (and thus which database server 42) should transmit/receive information in communicating with the customer and in communicating with the other aspects of the order management system 26. The use of a router 38 with shard determination logic 46 keeps the shard determination logic outside the database boundary. Maintaining an IMS application layer 56 and sharding logic 46 outside of the database boundary are aspects of implementation that ensures that the inventory is reliable and that the IMS application layer has visibility across the inventory database.

Inventory requests will always be intercepted by a routing layer 38, which will determine the appropriate shard 50 according to the shard determination logic. Shard determination logic 46 is responsible for the reliability of the identification of the database shard and may be responsible for identification of a database shard 50 for items going into and out of inventory. One of the advantages of such mechanism is the ability to horizontally scale the complete database (shards 50) underneath an IMS application layer 56 to support the load and volume of a particular retailer. Additionally, this allows for logical separation of the inventory database according to the nature of the database.

Various different parameters may be considered in determining how to shard an inventory database. The nature of the store 18 may determine the nature of the database sharding to some degree. In one example, a store 18 may operate with one or more brick and mortar store locations. In another example, a store may operate with an online store. In another example, a store may operate with brick and mortar locations in addition to an online storefront. In another example, a store may operate with brick and mortar locations, an online storefront, and an online marketplace. These different business models may advantageously utilize different models of inventory database sharding.

It will be appreciated that separated or sharded inventory or a separated or sharded database refer to placement of data regarding particular items of inventory or a particular portion of an inventory database on a particular database shard 50, typically operated by a particular database server 42. Separation or sharding of a particular type of item or a particular type of inventory refers to placement of inventory data associated with that type of item or that type of inventory on a particular database shard 50.

An inventory database may be sharded by separating the inventory data according to a catalog/item designation. In this implementation of sharding, inventory may be separated by category. Thus, different types of products may be separated and stored on different inventory database shards 50. A hierarchical category tree may be made for inventory and this organizational structure may be used to determine sharding of the inventory database. Thus, food and grocery items may be stored in one database shard while household items may be stored in a different database shard. Any particular seller/distributor specific item will reside in a given inventory database shard. Since most of the requests from consumers/producers have seller information and/or the item-inventory information, this information can be used to identify the database shard associated with the particular item. Similarly, when a customer searches online for a particular item on a store website 22, the search will typically designate a particular type of item and the search information would thus provide the information necessary for the shard determination logic to identify the database shard where information regarding the desired items is stored. This type of database sharding can be utilized to eliminate usual giant inventory database problems.

In another implementation of inventory database sharding, inventory database information may be separated by type of inventory. This may be particularly useful for a store 18 which provides different venues of sales, such as brick and mortar store locations, online sales, and online marketplace sales. In this example, the segregation of inventory data may be done based on the sales venue; for example store inventory vs online inventory vs marketplace inventory, or store owned inventory vs seller owned inventory.

In another implementation of inventory database sharding, inventory database information may be separated by operations which are performed by a consumer or producer. Based on the consumer/producer operations, inventory database traffic could be distributed to a specific shard. For example, all the inventory data for products with online purchase availability and reservation may be separated and stored on a specific database shard 50, regardless of whether the product is also available in a brick and mortar store location. This type of separation can be advantageous as the online inventory database service level agreement (SLA) is very high.

Additionally, inventory database data may be sharded based on a combination of any of the above approaches. In some instances, faster responses may be achieved by segregating inventory by combination of above approaches; such as by operation and seller inventory or by seller item and operation. Thus, all inventory data for products which may be purchased online may be separated from the in-store-only inventory and the online inventory may be further separated by online vs marketplace inventory, or by store owned or seller owned inventory. Each of these separated groups of inventory database information would be stored on a corresponding database shard 50.

One of the performance benefits of this mechanism is that it improves the reads and writes in a specific application exponentially. The only additional overhead injected by the system 26 is that the read or write for a particular customer request will need to go through the shard determination logic 46. It is thus advantageous to keep the shard determination logic 46 light. The order management system 26 may draw inventory information from multiple database shards 50 while providing information to a customer 10 or the store 18 in the context of presenting available items for sale, completing sales, filling orders, maintaining inventory, etc.

Referring now to FIG. 3, database shards 50 may be managed to improve the reliability and speed of the inventory database. The inventory database is typically managed by a computer which is associated with the inventory database. As such, the OMS server 34 or the router 38 may mange the inventory database. In the present example, the router 38 is described as managing the inventory database. The router may thus implement the IMS application layer 56 and the shard determination layer 46 in a manner which does not have a heavy overhead or unnecessarily affect the speed of communications with the OMS server 34 and other computers which form part of the order management system 26.

Figure 4:
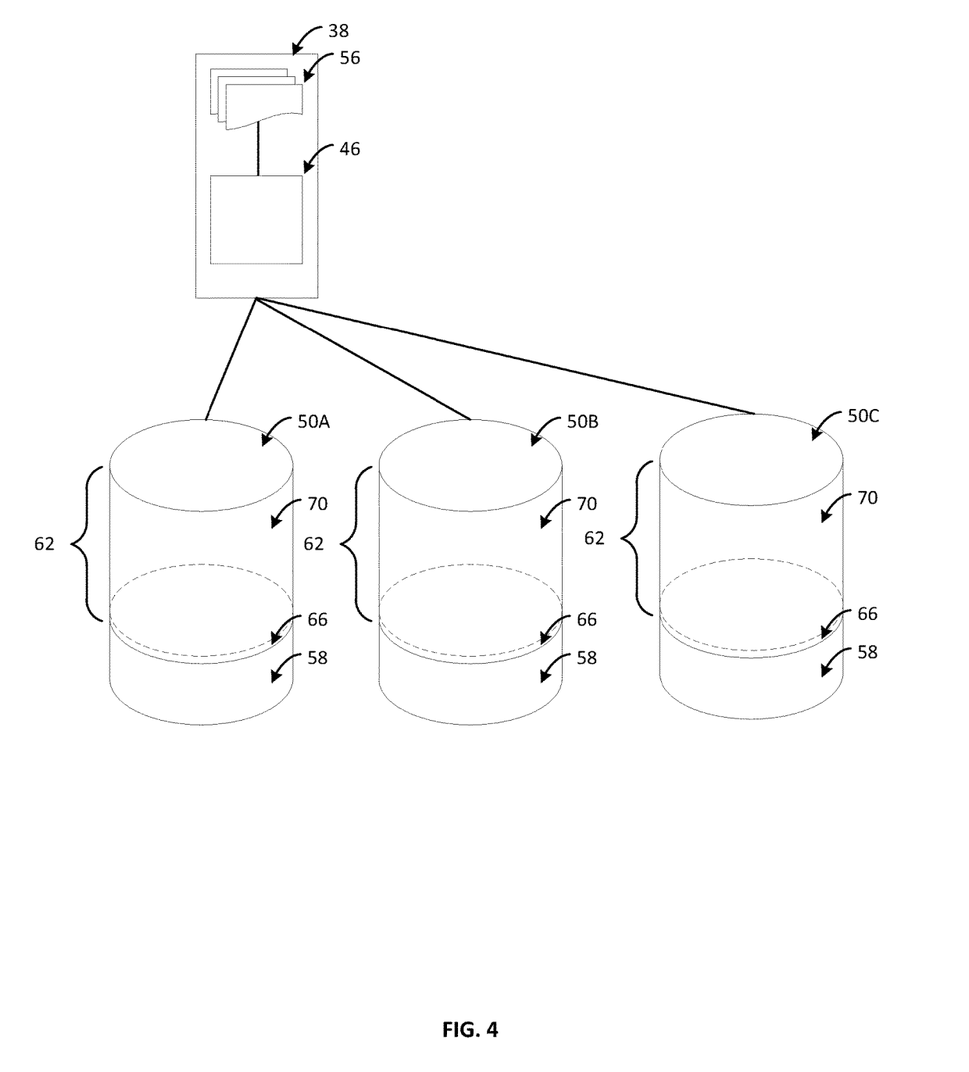
FIGS. 4, 5, and 6 are schematics illustrating various aspects of database shards forming part of the computer system.

FIG. 4 shows three database shards 50A, 50B, 50C in an inventory database. Each database shard 50 is typically implemented among an array of hard drives on a database server 42. Each database shard 50 includes a used portion 58, and an unused portion 62 representing available capacity in the shard. The unused portion 62 of the shard 50 includes a buffer capacity 66 which is necessary for the shard to perform read, write, and buffering operations during normal operation of the database server 42. The unused portion 66 of the shard 50 includes an available storage capacity 70 which has a storage capacity equal to the unused shard capacity 62 minus the buffer capacity 66.

Typically, the number of shards 50 which are used in the inventory database is determined by balancing the size and data bandwidth of the inventory (related to the number of products offered and sales volume) with the nature of the store and inventory. Thus, a shard 50A may be dedicated to items which are sold in a brick and mortar store, a shard 50B may be dedicated to items which are sold in an online store, and a shard 50C may be dedicated to items which are sold in an online marketplace by third party sellers.

In operation, the router 38 will work with the IMS application layer 56 and the shard determination logic 46 to appropriately distribute inventory data among the shards 50. In one example, the shard determination logic 46 (representative of the logic of separation of inventory into different parts) may operate so that the shards 50 have similar used capacities 58 and unused capacities 62. The number of shards 50 may be adjusted in performing system maintenance to help achieve this balance. For example, as online marketplace sales and inventory grow, an additional shard 50 may be added to the inventory database and allocated among the shard determination logic to store inventory data for the online marketplace inventory so that the load on the online marketplace inventory database servers 42 remains within a desired range.

A shard key may have a shard number (such as SH-1) which avoids the use of lookup tables or other more complex manners of the shard determination logic 46 identifying a particular shard 50. In this manner, the router 38 and shard determination logic 46 operate with minimal intrusion into the communication with the inventory database server 42.

The shard determination logic 46 thus indicates how different inventory data is allocated among different inventory database shards 50. In one example, the shard determination logic may, in part, contain the following data:

Shard 50A—inventory of items for sale in store
Shard 50B—inventory of items for sale online: Electronics
Shard 50C—inventory of items for sale online: All other
Shard 50D—inventory of items for sale in online marketplace: Sellers A through M
Shard 50E—inventory of items for sale in online marketplace: Sellers N through Z The IMS application layer 56 and the data associated with particular items may assist in implementing the shard determination logic 46 and in operating the inventory database shards 50. The IMS application layer 56 may comprise software for the operation and management of the inventory database. Thus, the IMS application layer 56 may govern the reading of inventory data from the inventory database shards 50, the writing of data to the inventory database shards 50, the modification of data in the inventory database shards 50, etc.

As items are added to the store inventory, a corresponding data entry is created or modified within the order management system 26. The data entry will contain various different data fields relevant to the sale of the item. Data fields may include item name, UPC code, price, description, etc. More relevant to the management of an inventory database, the data entry may include data fields such as where the item is sold (e.g. in store only), the category and type of the item (e.g. housewares; towels), the seller of the item, and the owner of the inventory. These data fields may also include the quantity of the item which are available for purchase and the location of these items. These data fields correspond to decisions which have been made in determining how to separate the inventory data among different database shards 50, and thus correspond to rules within the database determination logic 46. These data fields also provide information necessary to the store 18 to sell the item to customers and to allow for different types of sales such as store pickup of an item purchased online.

If an item is new in the store inventory, a data entry may be created for that item with the necessary data added to the various data fields. If an item is already in the store inventory, the data fields (such as price, quantity and location) may be updated as new inventory is received or as conditions surrounding the sale of this item change. The IMS application layer 56 may facilitate the creation of these data entries and the writing of this data in a database shard 50 for storage As inventory from a brick and mortar location is sold, the computer point of sale system may communicate with the IMS application layer 56 so that the inventory is updated to reflect the actual inventory. As a customer searches for items to purchase online, the customer search query will contain the information necessary to identify the database shard 50 which contains inventory/product information regarding the products which may be purchased.

For example, a customer may search for movies. As determined by the shard determination logic 46, inventory information for movies is stored in database shard 50B. The inventory database shard 50B may thus provide inventory information regarding the different available movies to the order management system 26 and this information is presented to the customer. The customer may select a movie for purchase, and may view the available delivery options. The customer may be presented with information that it is available for shipment to their home and that the movie may also be picked up at a local store. Upon completion of the sales transaction, the inventory may be updated. The shard determination logic 46 may thus be very light and, although it is inserted into every inventory query, it does not cause a delay in transmitting inventory information.

The IMS application layer 56 thus manages the creation and modification of inventory data within the inventory database shards 50 while the shard determination logic 46 provides the decision key which identifies which shard contains which inventory information consistent with the logical separation of inventory into different groups.

The order management system 26 (such as an individual database server 42 or the IMS application layer 56) may monitor the inventory data stored on each shard 50. As items are no longer sold and are removed from inventory from the store, the IMS application layer 56 and database server 42 may delete the item information from the inventory database shard 50. If desired, information regarding an item may be stored in an archive server. This will maintain the size of the used data 58 on the inventory database shards 50 to a steady state quantity of inventory data representative of the current store inventory and remove old inventory data from the active sharded inventory database. The size of the used data 58 on a shard 50 will thus grow with the current inventory/number of different items for sale.

The inventory database size will typically grow as additional items are added to inventory and the used data 58 on a shard 50 will grow and the available capacity 62 on the shard 50 will diminish. The order management system 26/IMS application layer 56 will monitor the available capacity 62 on the shards 50. This may be performed by the database servers 42. A threshold of necessary available capacity 70 may be set for proper operation of the database server 42 and database shroud 50. When the available capacity 62 is greater than the threshold of necessary capacity 70 plus the necessary buffer capacity 66, the shard 50 is operating with sufficient storage capacity. When the available capacity 62 is reduced to where the available capacity is equal to or less than the threshold storage capacity 70 plus the buffering capacity 66, the database server 42 or IMS application layer 56/order management system 26 may signal that it is necessary to add an additional database server 42 and database shard 50 to reduce the load on a particular database shard 50.

Figure 5:
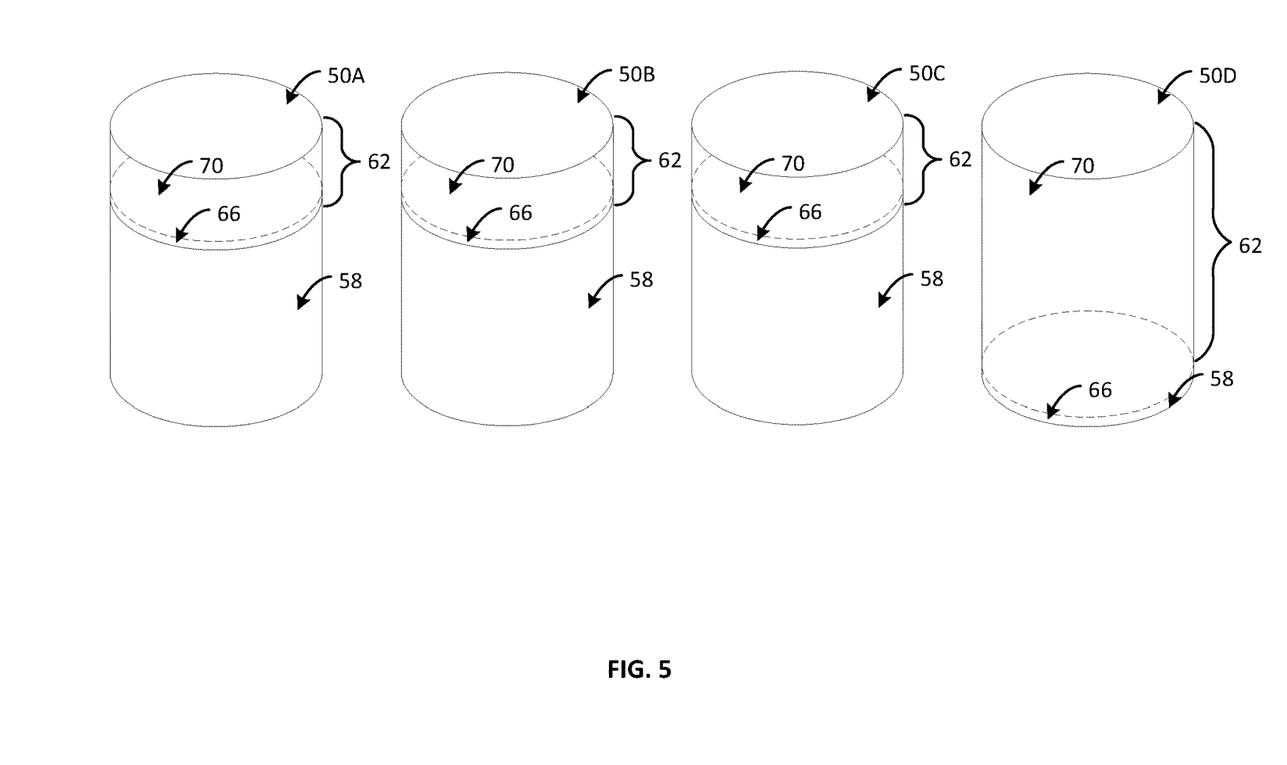
Figure 6:
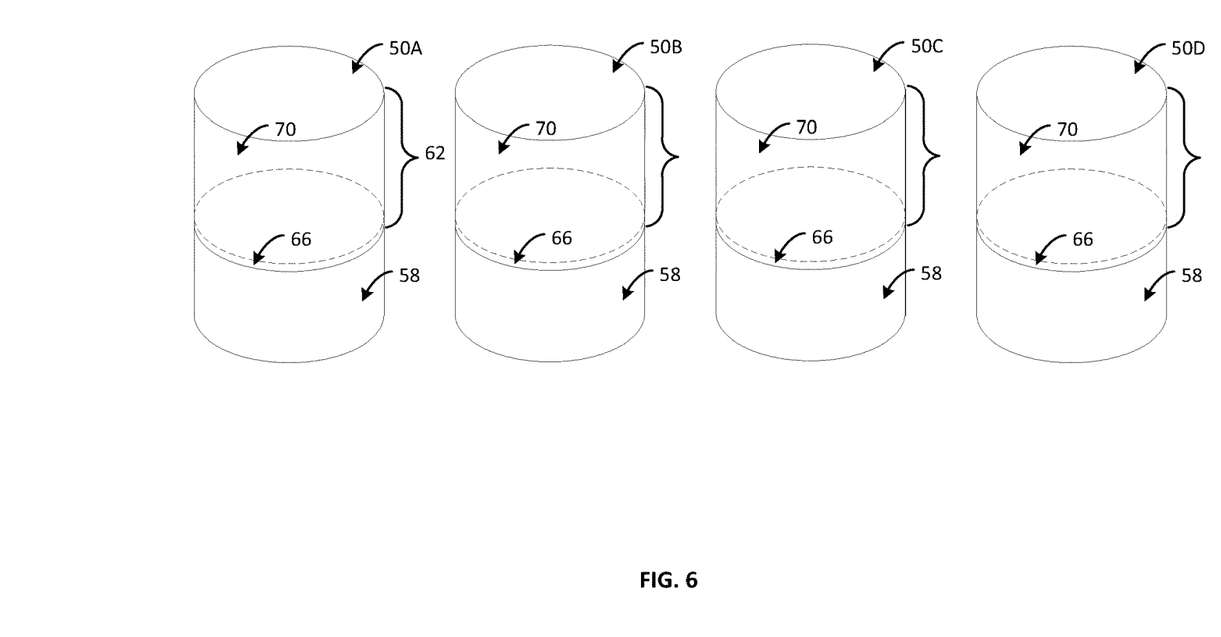

Referring now to FIG. 5, a new shard 50D may thus be added to the system 26. The new shard 50D will be empty, and will typically be added as part of a new database server 42 with includes the shard 50. The new shard 50D is added to fill a particular role due to the growth of data within a particular existing inventory database shard 50. The router 38 and shard determination logic 46 will thus be modified to include the new shard 50D and item data entries within an existing shard 50 may be move to the new shard 50D so that the inventory data is distributed appropriately among the shards 50. If, in an example system, shards 50D and 50E corresponding to inventory of items for sale in an online marketplace no longer have sufficient operational capacity, a new shard 50F may be added to the inventory database. The shard determination logic in the example presented above may be modified to contain the following data:

Shard 50A—inventory of items for sale in store
Shard 50B—inventory of items for sale online: Electronics
Shard 50C—inventory of items for sale online: All other
Shard 50D—inventory of items for sale in online marketplace: Sellers A through H
Shard 50E—inventory of items for sale in online marketplace: Sellers I through P
Shard 50F—inventory of items for sale in online marketplace: Sellers Q through Z Data stored in existing shard 50E may be moved to new shard 50F consistent with the shard determination logic 46 and data store in existing shard 50D may be moved to shard 50E so that the inventory data stored in the shards 50 is consistent with the shard determination logic. In another example of shard management, once a shard reaches a threshold operational capacity, a new shard 50 may be added and new inventory may be added to the new shard without moving data from existing shards. FIG. 6 shows an example where each shard 50A, 50B, 50C, 50D is balanced according to the shard determination logic 46 after adding a new shard 50D into the inventory database.

This system 26 significantly improves performance by allowing the inventory database to be tailored to the nature and quantity of inventory which is present. The shard determination logic 46 does not need excessive complexity to allow the IMS application layer 56 to monitor, read, and update inventory data and the sharded database does not increase the time for communications between a customer computer 14 or order management system computer and a database server 42. Item information may itself indicate a database shard (such as by using the type and nature of the item, using a shard number as a particular digit in the order number or placing the shard number in a data field associated with the order).

Figure 7:
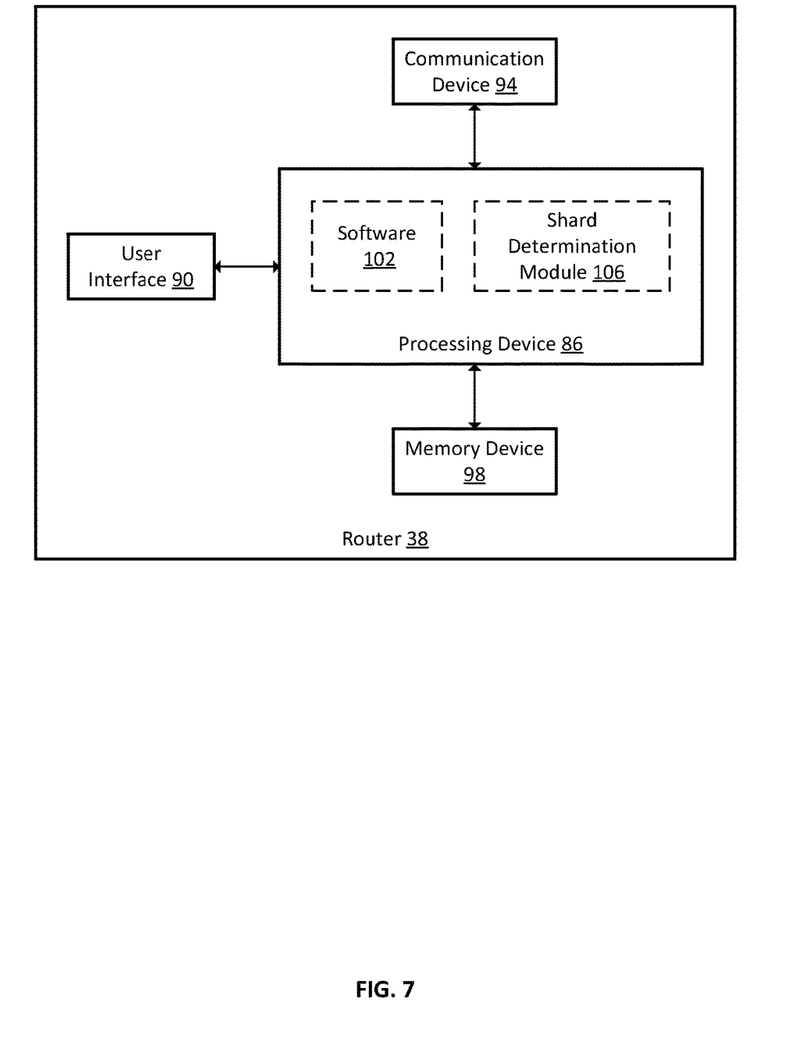
FIG. 7 is a schematic illustrating example components of the router.

Referring now to FIG. 7, a schematic illustrating example components of the router 38 is shown. As discussed, the router 38 may be a programmed computer or a dedicated hardware implementation. The router 38 includes a processing device 86, a user interface 90, a communication device 94, and a memory device 98. It is noted that the router 38 can include other components and some of the components are not required.

The processing device 86 can include memory, e.g., read only memory (ROM) and random access memory (RAM), storing processor-executable instructions and one or more processors that execute the processor-executable instructions. In embodiments where the processing device 86 includes two or more processors, the processors can operate in a parallel or distributed manner. The processing device 86 can execute the operating system of the router 38. In one example, the processing device 86 may also executes a software module 102 (which may include an IMS application layer 56) and a shard determination module 106 (which may include the shard determination logic 46).

The user interface 90 is a device that allows a user to interact with the router 38. While one user interface 90 is shown, the term "user interface" can include, but is not limited to, a touch screen, a physical keyboard, a mouse, etc. The communication device 94 is a device that allows the router 38 to communicate with another device, e.g., the servers 42 and 74. The communication device 94 can include one or more wireless transceivers for performing wireless communication and/or one or more communication ports for performing wired communication. The memory device 98 is a device that stores data generated or received by the router 38. The memory device 98 can include, but is not limited to, a hard disc drive, an optical disc drive, and/or a flash memory drive.

The software module 102 may allow the router 38 to interact with a customer, to interact with other computers within the store order management system 26, and to interact with a database server 42 to create and manage orders. The software module 102 may facilitate the customer selection of items for purchase at an online store website and may assist in maintaining accurate inventory information in an inventory database as orders are created and fulfilled and as purchases and inventory replenishment and growth occur within a store 18.

The shard determination module 106 allows router 38 to analyze information regarding an inventory query or request and to identify a shard 50 pertaining to that query. The shard determination module 106 also allows the router 38 to execute one or more other tasks as discussed herein. Particularly, the shard determination module 106 facilitates the communication between the computer 14, router 38 and server 34 or server 42.

A computer in the order management system may store a customer database. In some instances, the router 38 or an order management server 34 or a dedicated customer database server may store a customer database. The customer database may store information regarding specific customers, such as customer account information, customer contact information and preferences, customer order history, etc. The customer database may be queried by various devices in the order management system to record or retrieve information regarding customer orders and may assist in implementing the examples set forth.

Figure 8:
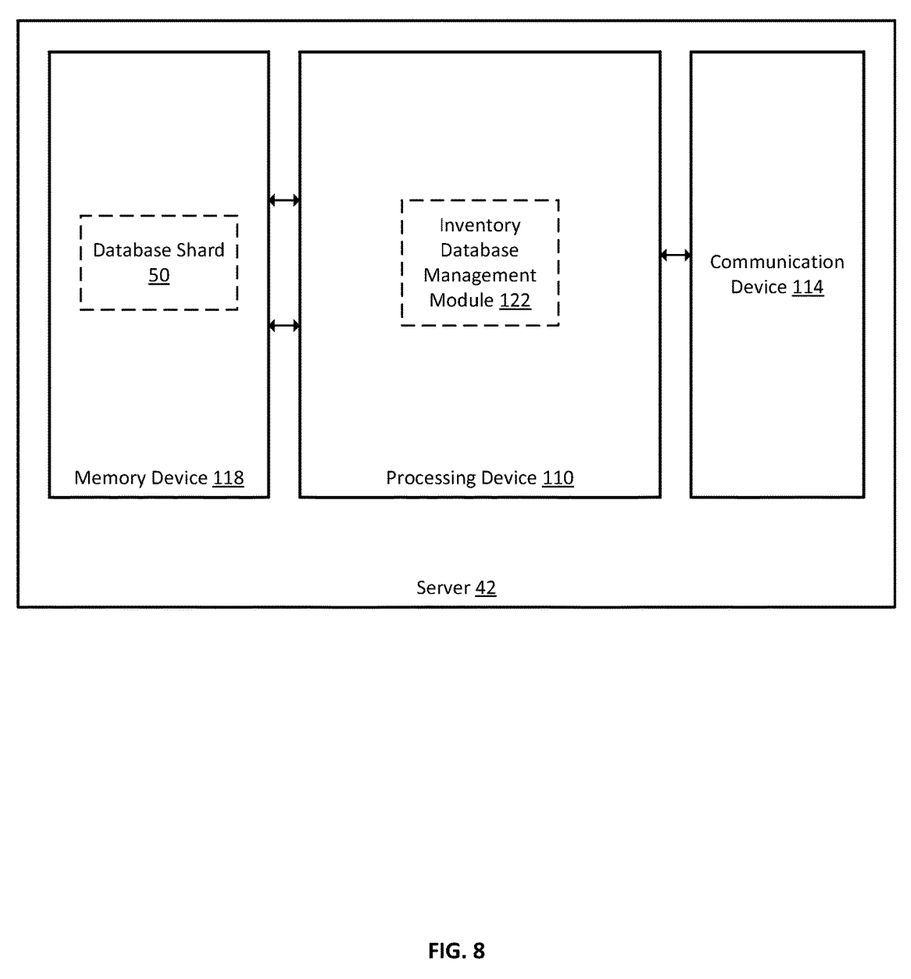
FIG. 8 is a schematic illustrating example components of a server.

Referring now to FIG. 8, a schematic illustrating example components of a server 42 is shown. The server 42 may be programmed to perform one or more functions at the request of the router 38, server 34, and order management system 26 and, according to various computing models, may execute some or all of the functions associated with operation of the order management system 26. The server 42 may include a processing device 110, a communication device 114, and a memory device 118.

The processing device 110 can include memory, e.g., read only memory (ROM) and random access memory (RAM), storing processor-executable instructions and one or more processors that execute the processor-executable instructions. In embodiments where the processing device 110 includes two or more processors, the processors can operate in a parallel or distributed manner. In the illustrative embodiment, the processing device 110 executes aspects of the order management system 26. For example, the processing device may execute an inventory database management module 122 which allows the server 42 to execute the various tasks associated with database operation and management. The inventory database management module may implement the IMS application layer 56 in whole or in part.

The communication device 114 is a device that allows the server 42 to communicate with another device, e.g., the router 38 and other computers within the store order management system 26. The communication device 114 can include one or more wireless transceivers for performing wireless communication and/or one or more communication ports for performing wired communication.

The memory device 118 is a device that stores data generated or received by the server 42. The memory device 118 can include, but is not limited to a hard disc drive, an optical disc drive, and/or a flash memory drive. Further, the memory device 118 may be distributed and located across multiple disc drives. The memory device 118 is accessible to the processing device 110. In some embodiments, the memory device 110 stores data such as an inventory database shard 50.

In some embodiments, the inventory database shard 50 can store information associated with items which are for sale such as products, UPC codes, descriptions, prices, etc. The inventory database shard 50 may be queried by the processing device 110 and may provide information to the processing device to facilitate the operation of an order management system 26.

The system is advantageous as it provides a sharded inventory database within an order management system which can accommodate massive order volumes such as tens of thousands of orders per minute without the overloading, delays, and loss of bandwidth to take orders that happen with a conventional system. The OMS application layer, IMS application layer, shard determination logic, and database management techniques allow a transactional database such as an inventory database to be sharded and allow the transactional database to be maintained at an operational size. The system can be implemented on existing servers and is transparent to customers.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:
1. A computer system comprising:
one or more computer processors;
one or more non-transitory memory storage systems storing computing instructions configured to run on the one or more computer processors;
a sharded store inventory database, the sharded store inventory database comprising:
  a first inventory database shard coupled to a first inventory database server, the first inventory database shard having a first inventory data for a first group of items sold by a store; and
  a second inventory database shard coupled to a second inventory database server, the second inventory database shard having a second inventory data for a second group of items sold by the store, the second group of items being different than the first group of items;
an order management server configured to receive the first inventory data and the second inventory data from the sharded store inventory database and to present the first inventory data and the second inventory data to a user via a webpage of the store;
a router associated with the sharded store inventory database is configured to:
  (a) receive a request by the user for item inventory data of an item sold by the store;
  (b) obtain, from the first inventory database shard and the second inventory database shard, the first inventory data and the second inventory data, respectively, for the item in response to the request from the user; and
  (c) provide the first inventory data and the second inventory data to the user;
a shard determination logic is inserted into every request for the item inventory data in order to transmit item inventory data information, wherein the shard determination logic comprises logic which, for the item sold by the store, identifies a respective one of the first inventory database shard and the second inventory database shard on which the item inventory data associated with the item is stored based on attributes of the item;
an inventory management system application layer configured to:
  (a) distribute the item inventory data among the first inventory database shard and the second inventory database shard;
  (b) manage creation and modification of the first inventory data and the second inventory data, wherein the inventory management system application layer is outside of an inventory database boundary of the sharded store inventory database, and wherein the inventory management system application layer is not sharded; and the inventory management system application layer performs maintenance services; and
  (c) balance a size and data bandwidth of each respective one of the first inventory database shard and the second inventory database shard as a function of a number of items offered in the each respective one of the first inventory database shard and the second inventory database shard and a sales volume corresponding to the each respective one of the first inventory database shard and the second inventory database shard, wherein the router comprises the shard determination logic, and wherein the shard determination logic is outside of the inventory database boundary; and a software application on a mobile computing device of the user comprises a user interface that interacts with the router to retrieve the item inventory data, as requested, wherein the item inventory data comprises information related to one or more orders by the user.

2. The computer system of claim 1, wherein:
the first inventory data comprises inventory data for the first group of items which are sold in a brick and mortar location by the store; and
the second inventory data comprises inventory data for the second group of items which are sold online by the store.

3. The computer system of claim 1, wherein:
the first inventory data comprises inventory data for the first group of items which are owned by the store and which are sold by the store; and
the second inventory data comprises inventory data for the second group of items which are owned by a third party and which are sold by the store.

4. The computer system of claim 1, wherein:
the first inventory data comprises inventory data for the first group of items which belong to a first category; and
the second inventory data comprises inventory data for the second group of items which belong to a second category, the second category being different than the first category.

5. The computer system of claim 1, wherein: the order management server is in communication with the sharded store inventory database via the router to receive the first inventory data and the second inventory data.

6. The computer system of claim 1, wherein the order management server is further configured to receive orders from the user placed with the store and an online marketplace.

7. The computer system of claim 1, further comprising an inventory server configured to determine whether the item is available for purchase at the store and at an online marketplace.

8. The computer system of claim 7, wherein the inventory server is further configured to determine whether the item is sold by a third party in the online marketplace.

9. A computer implemented method comprising:
storing, with a computer system using one or more processors, item inventory data for items sold by a store in an inventory database which is sharded into a first inventory database shard and a second inventory database shard, wherein:
the first inventory database shard is coupled to a first inventory database server;
the first inventory database shard has a first inventory data for a first group of items sold by the store;
the second inventory database shard is coupled to a second inventory database server;
the second inventory database shard has a second inventory data for a second group of items sold at the store;
the second group of items are different than the first group of items; and
an order management server is configured to receive the first inventory data and the second inventory data from a sharded store inventory database and to present the first inventory data and the second inventory data to a user via a webpage of the store;
inserting, by the computer system, a shard determination logic into every request for the item inventory data in order to transmit item inventory data information, wherein the shard determination logic comprises logic which, for an item sold by the store, identifies a respective one of the first inventory database shard and the second inventory database shard on which respective item inventory data associated with the item is stored based on attributes of the item;
distributing, by the computer system, using an inventory management system application layer, the item inventory data among the first inventory database shard and the second inventory database shard;
managing creation and modification of the first inventory data and the second inventory data, wherein the inventory management system application layer is outside of an inventory database boundary of the sharded store inventory database, and wherein the inventory management system application layer is not sharded, and the inventory management system application layer performs maintenance services;
balancing, by the computer system, a size and data bandwidth of each respective one of the first inventory database shard and the second inventory database shard as a function of a number of items offered in the each respective one of the first inventory database shard and the second inventory database shard and a sales volume corresponding to the each respective one of the first inventory database shard and the second inventory database shard, wherein a router associated with the sharded store inventory database comprises the shard determination logic, and wherein the shard determination logic is outside of the inventory database boundary;
receiving, with the computer system, at the router, a request by the user for the respective item inventory data of the item sold by the store;
obtaining, at the router, from the first inventory database shard and the second inventory database shard, the first inventory data and the second inventory data, respectively, for the item in response to the request from the user, the router being configured to provide the first inventory data and the second inventory data to the user; and
interacting, using a software application on a mobile computing device of the user, with the router using a user interface on the mobile computing device to retrieve the item inventory data, as requested, wherein the item inventory data comprises information related to one or more orders by the user.

10. The computer implemented method of claim 9, wherein:
the first inventory data comprises inventory data for the first group of items which are sold in a brick and mortar location by the store; and
the second inventory data comprises inventory data for the second group of items which are sold online by the store.

11. The computer implemented method of claim 9, wherein:
the first inventory data comprises inventory data for the first group of items which are owned by the store and which are sold by the store; and
the second inventory data comprises inventory data for the second group of items which are owned by a third party and which are sold by the store.

12. The computer implemented method of claim 9, wherein:
the first inventory data comprises item inventory data for the first group of items which belong to a first category; and the second inventory data comprises item inventory data for the second group of items which belong to a second category, the second category being different than the first category.

13. The computer implemented method of claim 9, further comprising:
receiving, at the order management server, the request regarding the respective item inventory data of the item which is sold by the store; and
transmitting the request regarding the respective item inventory data of the item which is sold by the store from the order management server to the router.

14. The computer implemented method of claim 13, further comprising:
receiving the request regarding the respective item inventory data of the item which is sold by the store at the order management server from the webpage of the store.

15. The computer implemented method of claim 9, wherein the order management server is further configured to receive orders from the user placed with the store and an online marketplace.

16. The computer implemented method of claim 9, wherein an inventory server is configured to determine whether the item is available for purchase at the store and at an online marketplace.

17. The computer implemented method of claim 16, wherein the inventory server is further configured to determine whether the item is sold by a third party in the online marketplace.

18. A computer system comprising:
one or more computer processors;
one or more non-transitory memory storage systems storing computing instructions configured to run on the one or more computer processors;
a sharded store inventory database, the sharded store inventory database comprising:
  a first inventory database shard coupled to a first inventory database server, the first inventory database shard having a first inventory data for a first group of items sold by a store, and the first inventory data comprises inventory data for items which are owned by the store and which are sold by the store;
  a second inventory database shard coupled to a second inventory database server, the second inventory database shard having a second inventory data for a second group of items sold by the store, and the second inventory data comprises inventory data for items which are owned by a third party and which are sold by the store;
  a third inventory database shard coupled to a third inventory database server, the third inventory database shard having a third inventory data for a third group of items sold by the store, and the third inventory data comprises inventory data for items which are sold in a brick and mortar location by the store; and
  a fourth inventory database shard coupled to a fourth inventory database server, the fourth inventory database shard having a fourth inventory data for a fourth group of items sold by the store, and the fourth inventory data comprises inventory data for items which are sold online by the store;
an order management server configured to receive the first inventory data, the second inventory data, the third inventory data, and the fourth inventory data from the sharded store inventory database and to present the first inventory data, the second inventory data, the third inventory data, and the fourth inventory data to a user via a webpage of the store;
a router associated with the sharded store inventory database is configured to:
  (a) receive a request by the user for item inventory data of an item sold by the store;
  (b) obtain, from the first inventory database shard, the second inventory database shard, the third inventory database shard, and the fourth inventory database shard, the first inventory data, the second inventory data, the third inventory data, and the fourth inventory data, respectively, for the item in response to the request from the user; and
  (c) provide the first inventory data, the second inventory data, the third inventory data, and the fourth inventory data to the user;
a shard determination logic is inserted into every request for the item inventory data in order to transmit item inventory data information, wherein the shard determination logic comprises logic which, for the item sold by the store, identifies a respective one of the first inventory database shard, the second inventory database shard, the third inventory database shard, and the fourth inventory database shard on which the item inventory data associated with the item is stored based on attributes of the item;
an inventory management system application layer configured to:
  (a) distribute the item inventory data among the first inventory database shard, the second inventory database shard, the third inventory database shard, and the fourth inventory database shard;
  (b) manage creation and modification of the first inventory data, the second inventory data, the third inventory data, and the fourth inventory data, wherein the inventory management system application layer is outside of an inventory database boundary of the sharded store inventory database, and wherein the inventory management system application layer is not sharded, and the inventory management system application layer performs maintenance services; and
  (c) balance a size and data bandwidth of each respective one of the first inventory database shard, the second inventory database shard, the third inventory database shard, and the fourth inventory database shard as a function of a number of items offered in the each respective one of the first inventory database shard, the second inventory database shard, the third inventory database shard, and the fourth inventory database shard and a sales volume corresponding to the each respective one of the first inventory database shard, the second inventory database shard, the third inventory database shard, and the fourth inventory database shard, wherein the router comprises the shard determination logic, and wherein the shard determination logic is outside of the inventory database boundary; and
a software application on a mobile computing device of the user comprises a user interface that interacts with the router to retrieve the item inventory data, as requested, wherein the item inventory data comprises information related to one or more orders by the user.

19. The computer system of claim 18, wherein the order management server is further configured to receive orders from the user placed with the store and an online marketplace.

20. The computer system of claim 18, further comprising an inventory server configured to determine whether the item is available for purchase at the store and at an online marketplace.

* * * * *